US012526853B2

(12) United States Patent
Lin

(10) Patent No.: US 12,526,853 B2
(45) Date of Patent: Jan. 13, 2026

(54) CERTIFICATE-BASED ADDITION OF NODES TO A WIRELESS MESH NETWORK

(71) Applicant: Palo Alto Networks, Inc., Santa Clara, CA (US)

(72) Inventor: Ta Chien Lin, Oakland, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 404 days.

(21) Appl. No.: 18/174,363

(22) Filed: Feb. 24, 2023

(65) Prior Publication Data

US 2024/0292472 A1    Aug. 29, 2024

(51) Int. Cl.
| | |
|---|---|
| *H04W 76/10* | (2018.01) |
| *H04W 12/069* | (2021.01) |
| *H04W 12/69* | (2021.01) |
| *H04W 84/18* | (2009.01) |

(52) U.S. Cl.
CPC ......... *H04W 76/10* (2018.02); *H04W 12/069* (2021.01); *H04W 12/69* (2021.01); *H04W 84/18* (2013.01)

(58) Field of Classification Search
CPC ............ G06F 21/00; H04L 9/08; H04W 8/22; H04W 36/36; H04W 24/02; H04W 48/14; H04W 76/02; H04W 64/003
See application file for complete search history.

(56) References Cited

U.S. PATENT DOCUMENTS

| | | |
|---|---|---|
| 2020/0403875 A1 | 12/2020 | Rooney et al. |
| 2021/0203527 A1 | 7/2021 | Strater et al. |
| 2023/0199488 A1* | 6/2023 | Del Sordo ............ H04W 76/11 726/5 |
| 2024/0080744 A1* | 3/2024 | Hotchkiss ............... H04L 41/22 |
| 2024/0223439 A1* | 7/2024 | Lo ......................... H04L 41/046 |

* cited by examiner

*Primary Examiner* — Iqbal Zaidi
(74) *Attorney, Agent, or Firm* — Gilliam IP PLLC

(57) ABSTRACT

A node being added to a wireless mesh network ("network") identifies an available wireless network(s) for which WPA-Enterprise is deployed that is advertised by a "gateway node," such as the network's main node. The new and main node have installed digital certificates that were issued by the mesh service provider. The node attempts to connect to the wireless network(s) using 802.1X authentication with its certificate. On successful network connection establishment, the node establishes a secure connection with an external service offered by the mesh service provider. Meanwhile, a user associated with the network scans a code attached to the node to initiate registration of the node for the user and network. The external service receives the encoded information, registers the node in association with the user and the network, and communicates a network configuration to the node over the secure connection. The node installs the configuration and is incorporated in the network as a satellite node.

20 Claims, 5 Drawing Sheets

CERTIFICATE-BASED ADDITION OF NODES TO A WIRELESS MESH NETWORK

BACKGROUND

The disclosure generally relates to transmission of digital information (e.g., CPC class H04L) and to maintenance, administration, or management of packet switching networks (e.g., CPC subclass H04L 41/00).

Wireless mesh networks are wireless networks in which multiple network devices, which may be referred to as "nodes," are communicatively interconnected to offer access to the same wireless network. In the context of wireless networks (e.g., Wi-Fi® networks), wireless mesh networks can be set up in which multiple nodes provide access to the same wireless network identified by a service set identifier (SSID). In a wireless mesh network, multiple nodes are dispersed around the location being serviced with the network. A main node of a wireless mesh network is a main router that connects to a modem or a gateway (i.e., a combination router/modem) to provide Internet access. One or more additional nodes are placed in range of the main node (for one additional node) and/or of each other (for multiple additional nodes) and, once added to the wireless mesh network, will broadcast the same SSID as the main node. Wireless clients can then connect to the wireless mesh network through any of the nodes, with satellite nodes transmitting network traffic back to the main node via backhaul to provide the wireless clients with Internet access.

To add a node in addition to the main node to a wireless mesh network, a mobile application from which the wireless mesh network is managed that is offered by the provider of the nodes is commonly employed. The mobile application provides for communication with the node provider's management service (e.g., a cloud service) that is communicatively coupled with the node(s) in the mesh network. From the mobile application, a user attempting to add the node can scan a scannable code (e.g., a quick response (QR) code) attached to the node to identify the node being added to the management service. From there, the user can manage connection of the new node to the mesh network from the mobile application, which triggers a series of communications between the management service, the main node, and the new node in which the main router communicates the SSID of the wireless mesh network to the new node.

BRIEF DESCRIPTION OF THE DRAWINGS

Aspects of the disclosure may be better understood by referencing the accompanying drawings.

DESCRIPTION

Figure 1:
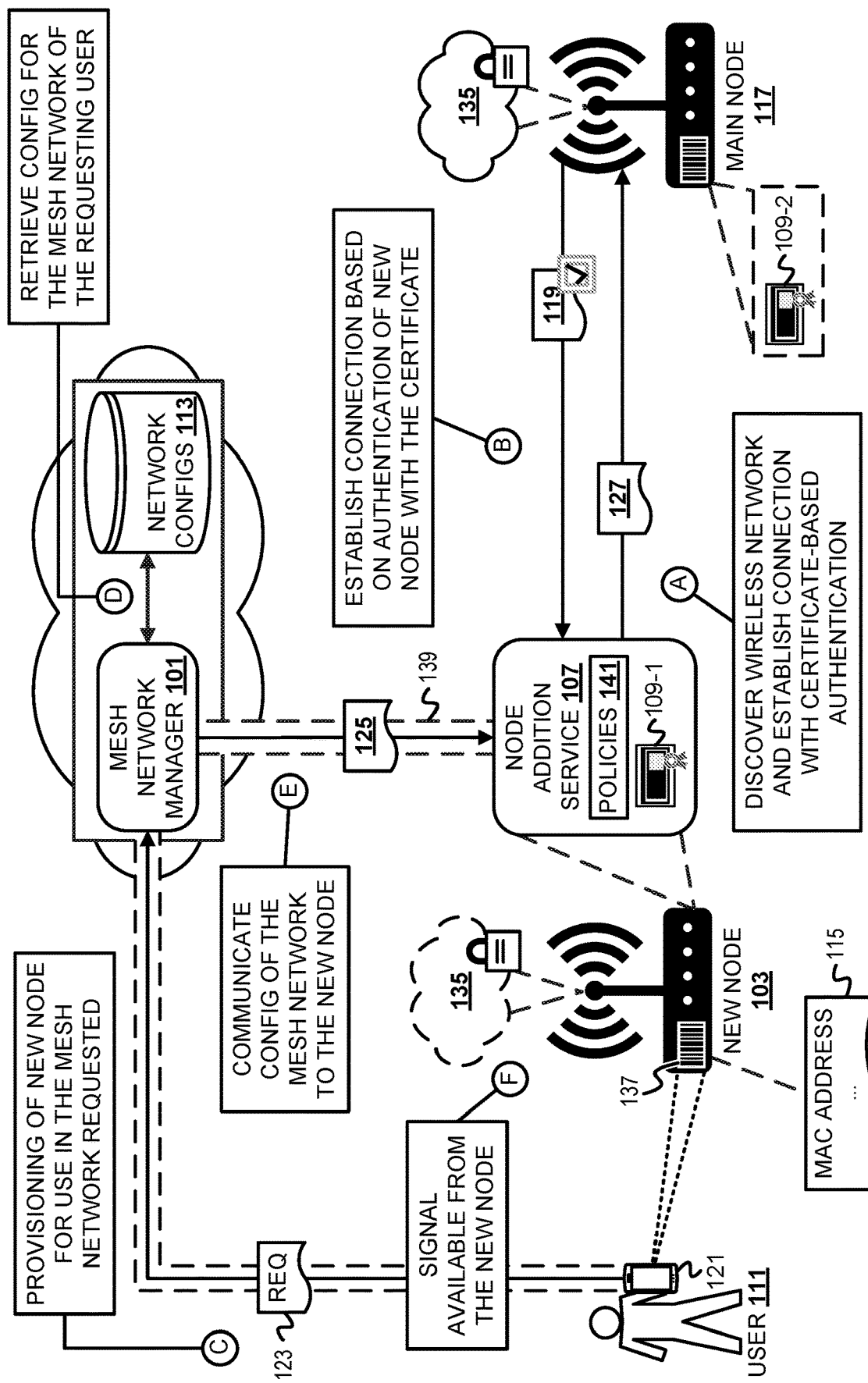
FIG. 1 is a conceptual diagram of utilizing device certificates for simplified addition of a satellite node to a wireless mesh network.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Terminology

This description uses the term "node" to refer to a device incorporated in a wireless mesh network. A node can refer to a main device incorporated in the wireless mesh network (a "main node"), where the main device is a network device (e.g., a mesh router) that connects to a modem or gateway via a wired connection. A node can also refer to the additional network device(s) incorporated in the wireless mesh network (a "satellite node(s)") that is at least connected to the main device, and the connection may be wireless.

This description uses shorthand terms related to cloud technology for efficiency and ease of explanation. When referring to "a cloud," this description is referring to the resources of a cloud service provider (CSP). For instance, a cloud can encompass the servers, virtual machines, and storage devices of a CSP. In more general terms, a cloud resource accessible to customers is a resource owned/managed by the CSP entity that is accessible via network connections. Often, the access is in accordance with an application programming interface or software development kit provided by the CSP.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

To simplify the procedure for adding a new node in a wireless mesh network in a manner that is both user-friendly and secure, certificate-based node onboarding without backhaul as disclosed herein can be leveraged. A customer of a wireless mesh networking service and device provider (the "mesh service provider") obtains (e.g., purchases) a node to add to a wireless mesh network that at least comprises a main node. The wireless mesh network to which this new node will be added is secured according to the Enterprise mode of the Wi-Fi Protected Access (WPA) security standard of one of its various versions. Both the new node and the main node have respective device certificates installed that have been issued by the mesh service provider, which uses its own certificate authority (CA) for the device certificates. The new and main nodes have been configured to use certificate-based authentication with these certificates for the WPA-Enterprise authentication method.

On boot of the new node by the customer, the new node discovers one or more wireless networks for which it is in range, including that provided by the wireless mesh network to which it is being added, based on beacon frames transmitted by the respective node(s). The new node identifies which of the wireless networks is/are secured per a version of the WPA-Enterprise standard based on the beacon frame field values; often, this results in identifying the wireless network provided by the main node, though the new node may identify other networks if multiple wireless networks are available that satisfy the criterion that WPA-Enterprise be implemented. The new node authenticates to the main node with its certificate as part of establishing a network connection. If authentication is unsuccessful and the new node thus identified a different wireless network (i.e., a wireless network with a different SSID than that of the wireless mesh network), the new node attempts network connection establishment for the next identified wireless network. Because the device certificates issued to the new and main nodes have the same chain of trust due to both being issued by the mesh service provider's CA, certificate-based authentication should be successful when the new node identifies and attempts to connect to the wireless network created through the wireless mesh network to which it is being added.

Once authenticated, the new node establishes a network connection to the wireless network corresponding to the node with which it completed certificate-based authentication (often the main node). Communications that are permitted via the established network connection are limited, as the new node is unavailable for connections by wireless clients until the mesh service provider has registered the new node for the wireless mesh network and the associated user. Registration of the new node can occur after the user scans a code (e.g., a QR code) attached to the new node that encodes information about the new node. The user scans the code from a client application, such as a mobile application, offered by the mesh service provider, which triggers transmission of a request to register the new node to a service of the mesh service provider that is external to the new node (e.g., a cloud-based service). On receipt of the information about the new node, the external service registers the new node for the user's mesh network and retrieves configuration information about the wireless mesh network that at least includes an SSID. The external service communicates the configuration information to the new node over the secure connection rather than the new node obtaining the SSID via backhaul from the main node. The new node installs the configuration and establishes a network connection to the wireless network identified by the SSID designated in the configuration information, which is the wireless network created by nodes of the wireless mesh network. Wireless clients can then establish network connections through the main node or the new node, which has become incorporated in the wireless mesh network as a satellite node.

Example Illustrations

FIG. 1 is a conceptual diagram of utilizing device certificates for simplified addition of a satellite node to a wireless mesh network. In this example, a new node 103 is being added to a wireless mesh network ("network") 135 that comprises a main node 117. The main node 117 is a main node of the network 135 that, while not depicted in FIG. 1 for clarity, can be connected to a modem or gateway to allow wireless clients of the network 135 to access the Internet. The network 135 is a wireless network, or a wireless local area network (WLAN) that is based on the Institute of Electrical and Electronics Engineers (IEEE) 802.11 standard, that is secured according to one of the versions of the WPA-Enterprise mode of security (i.e., WPA-Enterprise, WPA2-Enterprise, or WPA3-Enterprise) according to the authentication framework set forth in the IEEE 802.1X standard. As an example, the main node 117 may be deployed in a home environment, and the network 135 may be a wireless network that provides enterprise-level security for network communications in the home environment, such as for remote employees that seek enterprise-level network security provided by implementations of WPA-Enterprise in the home environment. In such cases, the network 135 may be a different wireless network having a different SSID than the home network to which users' endpoint devices connect. For instance, the network 135 may be a hidden network in a home environment that is separate from the private network in the home that may be visible.

The main node 117 has been configured to authenticate nodes requesting addition to the network 135 as satellite nodes with certificate-based authentication (e.g., via a configuration file(s) installed thereon) according to the 802.1X standard. Satellite nodes of the network 135 are thus authenticated with certificate-based 802.1X authentication when connecting to the main node 117. The new node 103 has been issued and installed a certificate 109-1. Similarly, the main node 117 has been issued and installed a certificate 109-2. The certificates 109-1, 109-2 are device certificates issued by a CA of the mesh service provider (e.g., a private CA). The mesh service provider has also provided the main node 117 and the new node 103 to a user 111, who is an end user of the network 135 (i.e., a user of a wireless client(s) that establishes a network connection via the network 135).

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a node addition service ("service") 107 executing on the new node 103 discovers a wireless signal transmitted by nodes of the network 135 and establishes a connection using certificate-based authentication. The service 107 manages node authentication and network connection establishment so that the new node 103 can be added to the network 135 as a satellite node. At boot of the new node 103 (e.g., in a home environment of the user 111), the service 107 discovers one or more wireless networks in range that implement a version of WPA-Enterprise mode for security, which will include the network 135. The service 107 can discover the wireless networks by inspecting beacon frames that the new node 103 detects (e.g., on its wireless network interface card (WNIC)). For instance, the service 107 can inspect detected beacon frames to determine whether any of the beacon frames correspond to wireless networks for which WPA-Enterprise mode is deployed. Whether a wireless network corresponding to a detected beacon frame has WPA-Enterprise mode deployed for authentication can be determined based on the Capability Information field of the beacon frames. Generally, when the network 135 is deployed in a home environment, beacon frames transmitted by the main node 117 for the network 135 will be the first that the service 107 determines to correspond to a WPA-Enterprise-secured network. This example assumes that this is the case; in other implementations, the service 107 may discover other WPA-Enterprise-secured networks. These cases are described in reference to FIG. 2.

On identification of the network 135 based on an associated beacon frame transmitted by the main node 117, the service 107 initiates a connection attempt between the new node 103 and the main node 117. Initiating the connection attempt can include exchanging a sequence of 802.11 management frames with the main node 117 to associate the new node 103 to the main node 117. Once the new node 103 is associated to the main node 117, the new node 103 authenticates to the main node 117 via the service 107 with 802.1X authentication that uses certificates for authentication as necessitated by the WPA-Enterprise configuration of the network 135. The service 107 may authenticate to the main node 117 based on the certificates 109-1, 109-2 by implementing Extensible Authentication Protocol-Transport Layer Security (EAP-TLS) or another authentication framework. Authentication of the service 107 to the main node 117 occurs in accordance with the authentication framework being implemented (e.g., EAP-TLS). To illustrate with respect to this example, as part of authenticating to the main node 117 (e.g., per EAP-TLS), the service 107 communicates an identity 127 to the main node 117 that indicates the certificate 109-1. The main node 117 can maintain or have access to a certificate store based on which it validates the certificate 109-1. Similarly, the service 107 can comprise or have access to a certificate store based on which it verifies the certificate 109-2 provided by the main node 117. On successful verification that the certificate 109-1 has been issued by a trusted entity (i.e., the CA of the mesh service provider), the main node 117 communicates a response 119 to the service 107 that indicates an authentication success. Authentication is successful because the new node 103 and the main node 117 were both issued device certificates by the same CA used by the mesh service provider for issuing device certificates to mesh network nodes.

At stage B, on successful authentication to the service 107, the new node 103 establishes a network connection via the network 135. The new node 103 has been preconfigured to allow for limited data exchange over the established network connection following successful completion of 802.1X authentication and before provisioning/establishing ownership of the new node 103. Policies 141 may be attached to (i.e., installed on or otherwise accessible to) the service 107 that indicate permitted connections that the new node 103 may establish during this period of limited data exchange. For instance, the policies 141 when enforced may act as a filter for network traffic to allow transmission or receipt of communications that have been designated as permitted (e.g., communications with the network manager 101). The period of limited data exchange is enforced until a mesh network manager ("network manager") 101 has provisioned the new node 103 to (i.e., verified to belong to) the user 111 as is described in subsequent stages. For instance, the new node 103 may be limited to data exchange over the network 135 with the network manager 101 and does not set up a wireless network that is available for network connections, forward network traffic (e.g., to devices attempting to connect to the new node 103, such as via an Ethernet connection), or permit connections with wireless clients until it has been provisioned. The new node 103 may thus be limited to sending outgoing network traffic originating at the new node 103 over the established network connection. For instance, a first of the policies 141 may indicate an IP address(es) of the network manager 101 as a permitted endpoint for new connections established over the network 135. If the CA used by the mesh service provider for certificate issuance and validation is not encompassed by the network manager 101, the policies 141 may also indicate an IP address(es) associated with the CA.

During the period of limited data exchange, the service 107 establishes a secure connection 139 with the network manager 101. The network manager 101 in this example is implemented as a cloud service of the mesh service provider that has issued the main node 117 and the new node 103 to the user 111. The service 107 can establish the secure connection 139 at this stage because the network manager 101 is a permitted connection endpoint before the new node 103 has been provisioned (e.g., based on designation as a permitted communication source/destination by the policies 141). The secure connection 139 may be a Transmission Control Protocol (TCP) connection having Secure Sockets Layer (SSL)/Transport Layer Security (TLS) running thereon. When negotiating the secure connection 139 between the new node 103 and the network manager 101 as an SSL/TLS connection, the service 107 utilizes the certificate 109-1 for the SSL/TLS handshake, where the network manager 101 also provides a certificate that may be issued by the same CA or a different CA for the handshake (e.g., an SSL/TLS certificate). The certificate 109-1 installed on the new node 103 is thus used at two stages of adding the new node 103 to the mesh network: when the new node 103 is authenticated as described at stage A and when the new node 103 establishes the secure connection 139 with the network manager 101.

At stage C, the user 111 scans a code 137 of the new node 103 from a client device 121 to initiate provisioning of the new node 103. The client device 121 is depicted as a mobile phone with a camera in this example but can be any device having a network connection, a camera, and compatibility with QR codes/barcodes. The client device 121 may be connected to the network 135 or a cellular wireless network. The code 137 is a scannable code such as a barcode or QR code that has been physically placed on the new node 103 (as depicted in this example) or a manual associated therewith by the mesh service provider. The code 137 encodes information 115 that identifies the new node 103, such as a media access control (MAC) address assigned to the NIC of the new node 103. The user 111 scans the code 137 from an application offered to mesh network end users by the mesh service provider that the user 111 accesses from the client device 121. The application may be a user-facing component of the network manager 101, such as a user portal for users registered with the mesh service provider. The application may be a web application, a Software-as-a-Service (SaaS) application, or an application installed on the client device 121 (e.g., a mobile application) and comprises QR code/ barcode decoding capabilities. FIG. 1 assumes that the user 111 is logged into an account with the mesh service provider from the client device 121 and has navigated through the node addition flow, which at least includes being prompted to scan a code of the node that the user 111 is attempting to add to the network 135. Scanning of the code 137 from the client device 121 triggers generation of a request 123 that is communicated to the network manager 101 (e.g., over another secure connection between the client device 121 and the network manager 101). The request 123 indicates the information 115 that was decoded from the code 137 on read. The request 123 may also include identifying information of the user 111. For instance, the request 123 can indicate a user identifier that the application determined from a login session associated with the user 111 and inserted into the request 123.

At stage D, on receipt of the request 123, the network manager 101 retrieves a configuration of the network 135 that it has stored for the user 111 indicated in the request 123. If the identifying information about the user 111 was not determined client side and included in the request 123, the network manager 101 can determine the identifying information based on session information that it maintains for the connection with the client device 121 (e.g., a login session). The network manager 101 maintains or has access to a repository 113 of mesh network configurations of users registered with the mesh service provider (e.g., based on having an account registered). While depicted as one repository in FIG. 1, the repository 113 of mesh network configurations can encompass multiple repositories in implementations (e.g., a first repository for network configurations, a second repository for records of nodes provisioned to users, etc.). The repository 113 may be indexed by a user identifier (s), such as username, that has a same type(s) as the identifying information about the user 111. Each mesh network configuration stored in the repository 113 at least comprises an SSID of the corresponding user's mesh network. For instance, an entry of the repository 113 that indicates the user 111 comprises the SSID of the network 135. The SSID stored in the repository 113 for the network 135 may be a default SSID set for the main node 117 or may be a custom SSID set by the user 111. Entries may also comprise additional configuration information about the user's mesh network, such as a designated frequency band, channel width, etc., and/or a security configuration of the user's mesh network. The network manager 101 determines the identifying information about the user 111 that was included in the request 123 and queries the repository 113 with the identifying information. In response, the network manager 101 retrieves a mesh network configuration ("configuration") 125 of the network 135 that comprises the network 135 SSID and any other configured properties of the network 135.

In addition to retrieving the configuration 125, the network manager 101 provisions the new node 103 to the user 111 after receiving the request 123. Provisioning a node to a user refers to establishing ownership of a node for a user. Provisioning the new node 103 may include updating an account of the user 111 with at least a subset of the identifying information 115 of the new node 103 that is determined from the request 123 and/or updating the repository 113 with the identifying information 115. For instance, each entry of the repository 113 corresponding to a user may also comprise indications of one or more nodes registered for the user's mesh network (e.g., node MAC addresses). With respect to the user 111, the corresponding entry in the repository 113 can indicate the main node 117 in addition to the network 135 SSID. To provision the new node 103 through an update to the repository 113, the network manager 101 communicates an update to the repository 113 that indicates the identifying information of the user 111 (e.g., a username) and the subset of the identifying information of the new node 103 determined from the request 123. Provisioning the new node 103 to the user 111 associates the new node 103 with the network 135 so the new node 103 can be added to the mesh configuration of the network 135.

At stage E, the network manager 101 communicates the configuration 125 to the new node 103 over the secure connection 139. The network manager 101 can identify the secure connection 139 established with the new node 103 as corresponding to the request 123 originating from the user 111 based on matching the configuration 125 to identifying information that was provided by the new node 103 when establishing the secure connection 139, such the SSID of the network 135, MAC address of the new node, etc. The service 107 receives the configuration 125 over the secure connection 139 and installs the configuration 125 to the new node 103. Since the new node 103 was already connected to the network 135 after successful certificate-based authentication, installation of the configuration 125 configures the new node 103 as a satellite node of the network 135. Following route advertisement by the new node 103, the new node 103 and main node 117 update their respective routing tables with routes corresponding to the nodes of the network 135 updated to encompass the new node 103 according to routing protocol used for the network 135.

At stage F, the new node 103 transmits a wireless signal of the network 135. Transmission of the wireless signal of the network 135 by the new node 103 allows for wireless clients to discover the network 135 and establish network connections via the new node 103 since the new node 103 will begin broadcasting the SSID of the network 135 (i.e., in beacon frames). In other words, the network 135 is extended to the new node 103 once it has been added as a satellite node. Wireless clients can subsequently establish network connections via the network 135 and send/receive network traffic via the new node 103 in addition to the main node 117 based on proximity.

FIG. 1 depicts an example in which the service 107 completes 802.1X authentication and establishes the secure connection 139 with the network manager 101 at stages A/B before the user 111 has scanned the code 137 of the new node 103 to initiate provisioning of the new node 103 at stage C. This ordering of stages of operations has been depicted for clarity and to aid in understanding. However, in implementations, the user 111 may scan the code 137 at a time before or at least partially overlapping with the establishment of the secure connection 139 since the new node 103 is not necessarily powered on or even with a network connection. As a result, the stages of operations may be performed in a different order or at least partially concurrently or in parallel. To illustrate, the user 111 may scan the code 137 of the new node 103 before the new node 103 is powered on. The network manager 101 receives the request 123, retrieves the configuration, and queues the configuration 125 for communication to the service 107 once the secure connection 139 has been established. After the new node 103 is powered on, the service 107 establishes the initial connection to the network 135 and then the secure connection 139 with the network manager 101. The service 107 receives the configuration 125 over the secure connection 139 and installs the configuration to the new node 103, which results in the new node 103 being added to the network 135 as a satellite node. Data exchange between the new node 103 and other endpoints may not be limited as was described above at stage B (e.g., based on filtering of permitted communications based on the policies 141) in such cases because the new node 103 has already been provisioned by the user 111 by the time the new node 103 has been authenticated to the main node 117 and established a connection to the network 135.

Figure 2A:
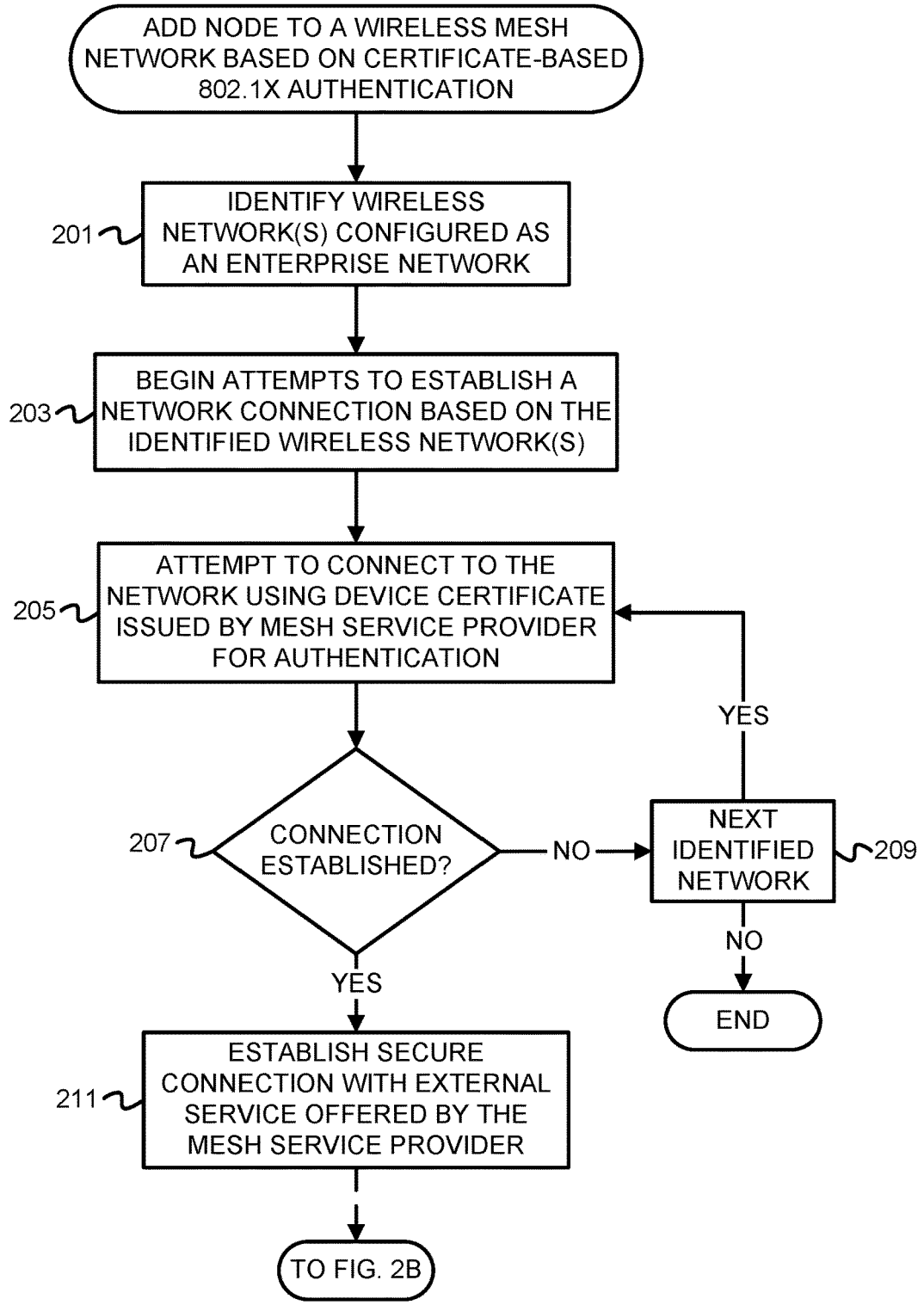
FIGS. 2A-2B are a flowchart of example operations for adding a node to a wireless mesh network based on certificate-based 802.1X authentication.
Figure 2B:
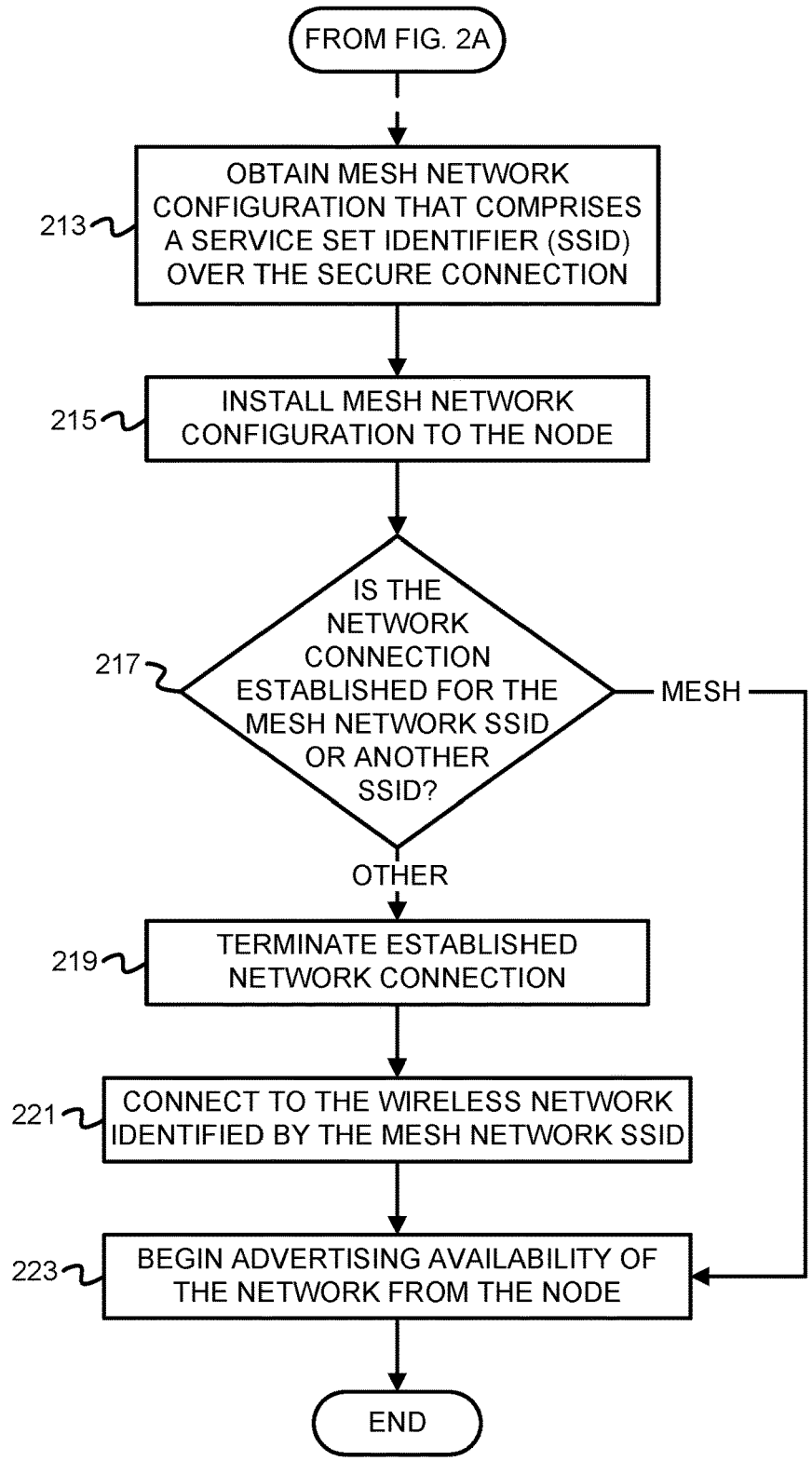
Figure 3:
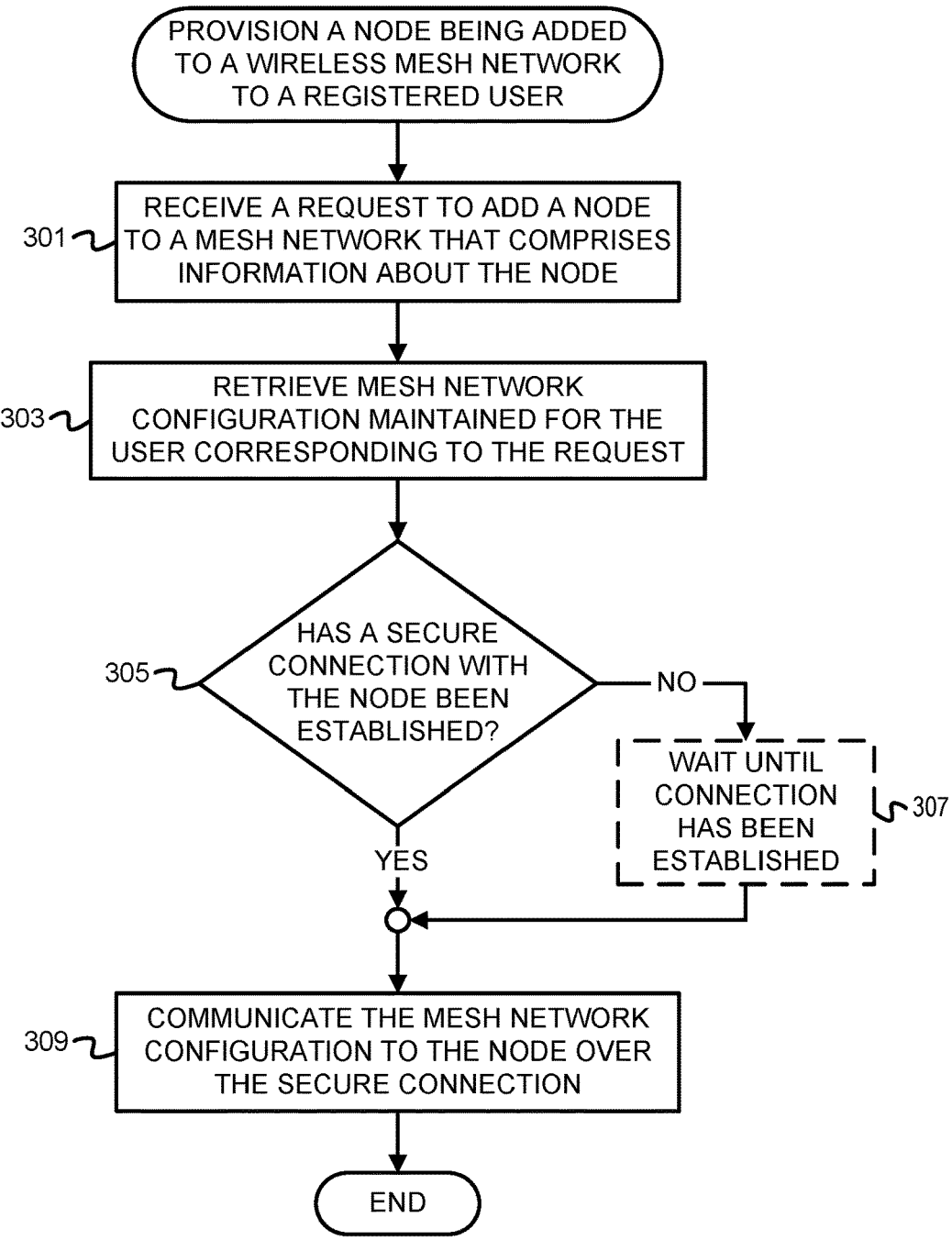
FIG. 3 is a flowchart of example operations for provisioning a node being added to a wireless mesh network to a registered user.

FIGS. 2A, 2B, and 3 are flowcharts of example operations for adding nodes to a wireless mesh network with certificate-based authentication. The example operations are described with reference to a node addition service and a mesh network manager (hereinafter "the service" and "the network manager," respectively) for consistency with FIG. 1. The names chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIGS. 2A-2B are a flowchart of example operations for adding a node to a wireless mesh network based on certificate-based 802.1X authentication. The example operations are described with reference to the service that executes on the node being added to the wireless mesh network. The example operations assume that a CA of a mesh service provider with which the service is associated has issued a device certificate to each of a node on which the service executes (hereafter referred to as "the node") and at least one additional node.

At block 201, the service identifies one or more wireless networks that are configured as an enterprise network. A wireless network is configured as an enterprise network if it has a version of WPA-Enterprise deployed for security and thus implements 802.1X authentication. The service can identify the wireless network(s) based on analysis of beacon frames transmitted by network devices in range of the node that the node receives on a WNIC to determine whether a detected beacon frame indicates that the associated wireless network has WPA-Enterprise deployed for security. For instance, the service may analyze the capability information field of a beacon frame to determine whether the value of the field indicates that the associated wireless network is secured with 802.1X authentication. If the service determines that a wireless network for which a beacon frame was detected satisfies the criterion that WPA-Enterprise be implemented for authentication, the service may determine the SSID from the beacon frame so that connection establishment can be initiated. For instance, the service may extract (e.g., copy) the SSID and add the SSID to a data structure of SSIDs that identify wireless networks that satisfy the criterion for deployment of WPA-Enterprise. Since the node may detect multiple beacon frames corresponding to the same network in a relatively short timeframe depending on the beacon interval being used, the service may analyze one beacon frame per wireless network and disregard subsequent beacon frames matching the format of the prior beacon frame. The service should at least identify the wireless network that is created by the mesh network to which the node is being added.

At block 203, the service initiates attempts by the node to establish a network connection based on the identified wireless network(s). Connecting to a wireless network by the node proceeds according to WLAN protocol, and the node is configured to use certificate-based authentication for 802.1X authentication via installation of the service thereon. If two or more wireless networks were identified, "the wireless network" as referenced in subsequent operations refers to the wireless network to which a connection is currently being attempted. For instance, the service may iterate through the SSIDs that were stored in the data structure of SSIDs that satisfied the criterion for implementation of WPA-Enterprise.

At block 205, the node attempts to connect to the wireless network via the service using the device certificate issued by the mesh service provider for authentication. The node first associates with a node that is providing the wireless network (the "gateway node") through exchanging a series of 802.11 management frames as set forth by WLAN protocol. Following association of the node with the gateway node, the node attempts to authenticate to the gateway node with certificate-based 802.1X authentication via the service using the device certificate installed thereon. Certificate-based authentication may be performed based on data/information that are/is stored local to the node and the gateway node, including device certificates.

At block 207, operations proceed based on whether a connection could be established following successful certificate-based 802.1X authentication of the node. If the gateway node also had a device certificate issued by the CA of the mesh service provider installed thereon and was configured for certificate-based 802.1X authentication, as should be the case for at least the main node of the mesh network, authentication should be successful and yield a connection being established between the node and the gateway node. If a network connection could not be established (e.g., due to unsuccessful authentication or incompatibility of the gateway node with certificate-based authentication), operations continue at block 209. If a network connection permitting data exchange between the node and the gateway node was established, operations continue at block 211.

As a result of the node establishing an initial network connection via the gateway node, the service may place the node in a condition for limited network communications. For instance, the service may limit network communications to communications between the node and an external (e.g., cloud-based) service offered by the mesh service provider until the node has been provisioned and incorporated into the wireless mesh network as will be described in reference to FIG. 3. Communications that may be blocked or otherwise prohibited can include data exchange with endpoint devices (e.g., based on connection of endpoint devices to the node via Ethernet cabling), for example. As an example, the service may maintain one or more IP addresses associated with the mesh service provider with which data exchange over the wireless network is permitted. The service may enforce these limitations on network communications when the node is powered on and operating but has not yet received a configuration of the wireless mesh network (e.g., as a result of provisioning/establishment of ownership of the node).

At block 209, the service proceeds with a connection attempt for the next identified wireless network having a version of WPA-Enterprise deployed. These example operations assume that at least one wireless network secured using certificate-based 802.1X authentication could be identified and the node can successfully authenticate to connect to the wireless network, which is the case if the main node and any existing satellite nodes of the mesh network is configured and functioning properly.

At block 211, the service establishes a secure connection with an external service offered by the mesh service provider (i.e., the network manager). As described above, the network manager can be a cloud-based service that is managed by the mesh service provider. The service may have been preconfigured with an IP address(es) associated with the network manager for establishing the connection. The service may negotiate a TCP connection with SSL/TLS for encryption of the connection, where the device certificate is again used for the SSL/TLS handshake.

At block 213, the service obtains a configuration of the wireless mesh network that comprises an SSID over the secure connection. As will be described in further detail in reference to FIG. 3, the external service managed by the cloud service provider maintains or has access to one or more repositories of wireless mesh network configurations for wireless mesh networks that are registered for users having one or more nodes provided by the mesh service provider (e.g., customers of the mesh service provider). The wireless mesh network configuration obtained by the service at least comprises the SSID of the user's wireless mesh network to which the node is being added as a satellite node. The use of certificate-based authentication for adding the node to the wireless mesh network thus does not necessitate storage of credentials (e.g., pre-shared keys) of the wireless mesh network on nodes of the network, and the wireless mesh network configuration can be obtained based instead on the use of certificates that have already been issued to the nodes.

FIGS. 2A-2B depict a dashed line between blocks 211 and 213. The operations depicted at block 213 occur after the node has been provisioned based on the user of the node scanning a code (e.g., a QR code) located on the node. The user scanning the code and the service establishing the secure connection with the external service of the mesh network provider are independent events and can occur in any order and/or at least partially concurrently. Thus, to represent the potential delay between the service establishing the secure connection and receiving the mesh network configuration over the secure connection depending on when the user scans the code, the line is depicted as dashed.

At block 215, the service installs the wireless mesh network configuration to the node. At block 217, following installation of the wireless configuration, the service determines whether the network connection is established for the mesh network SSID or another SSID. The network connection may have been established for a network identified by a different SSID if, at block 201, the node identified multiple wireless networks corresponding to network devices having respective device certificates issued by the mesh service provider. 802.1X authentication was successful because the gateway node and the node being added to the mesh network were issued device certificates by the same CA (i.e., the CA of the mesh service provider). The connection to another network does not introduce a security issue because the node's network communications are limited until the mesh network configuration is received over the secure connection and installed thereon, which triggers reestablishment of a network connection to the designated wireless network. If the SSID indicated in the wireless mesh network configuration differs from that which identifies the wireless network for which the service established the network connection, operations continue at block 219. Otherwise, if the SSID indicated in the wireless mesh network configuration and the SSID identifying the wireless network for which the connection was established are the same, the gateway node is a node of the wireless mesh network, and operations continue at block 223.

At block 219, the service terminates the established network connection. The service disconnects from the gateway node to which it initially connected so the connection to the wireless network created by the mesh network can be established. The service can terminate the connection by initiating transmission of a disassociation frame and/or deauthentication frame to the gateway node.

At block 221, the service initiates connection of the node to the wireless network identified by the mesh network SSID. Connecting to the wireless network includes exchanging a series of 802.11 management frames and completing certificate-based 802.1X authentication to the main node or other satellite node of the mesh network for which the node is in range that advertises the SSID designated in the configuration.

At block 223, the service begins advertising availability of the wireless network from the node. The service makes the wireless network available to wireless clients without limiting communications to the network manager executing as an external service as was described above. Making the wireless network available includes permitting transmission of beacon frames and probe response frames that indicate the mesh network's SSID by the node and extending the wireless network created through the wireless mesh network to the node. Additionally, nodes of the wireless mesh network (including the newly-added node) update their routing tables according to the protocol implemented for the wireless mesh network to provide availability of the wireless network across the nodes. The node is thus incorporated in the wireless mesh network as a satellite node. Connections to the wireless network by wireless clients can be through the node in addition to the main node once incorporated as a satellite node.

FIG. 3 is a flowchart of example operations for provisioning a node being added to a wireless mesh network to a registered user. A "registered user" refers to a customer of the mesh service provider who has a registered account with the mesh service provider. The example operations are described with reference to the network manager.

At block 301, the network manager receives a request to add a node to a wireless mesh network, where the request comprises information about the node. The network manager receives the request over a secure connection that was established with a client device of the registered user (e.g., during a login session). The request was generated and transmitted to the network manager over the secure connection based on the registered user using the client device to scan an encoding of the information about the node that is located on the node or a manual associated with the node. The information about the node may comprise MAC address, serial number, device type, etc. The request may also comprise information that identifies the registered user, such as a username and/or an account name or number.

At block 303, the network manager retrieves a wireless mesh network configuration that is maintained for the user corresponding to the request. If the identifying information of the user was not included in the request, the network manager determines the user-identifying information that corresponds to the request. For instance, the network manager can determine the username, account name, etc. based on a login session corresponding to the client device from which the request was received. The network manager maintains and/or has access to one or more repositories of wireless mesh network configurations (e.g., configuration files and/or data structures storing configuration information) for registered users, where each mesh network configuration at least indicates an SSID of the corresponding wireless mesh network. The wireless mesh network configurations may also comprise additional configuration information that is standard for wireless networks and mesh networks. The repository (ies) can be queried by user identifier that the network manager extracts (e.g., copies) from the request or can determine from session information corresponding to the client application from which the request originated (e.g., a login session), such as a username, account number, etc. The network manager queries the repository (ies) based on the identifying user information to retrieve the configuration of the wireless mesh network that is maintained therefor.

At block 305, the network manager determines whether a secure connection with the node has been established. Determination of whether a secure connection has been established can be based on evaluating identifying information provided by nodes when establishing a secure connection with the network manager (e.g., information provided in accordance with a protocol for connection establishment being used). For instance, if a secure connection with one or more nodes has been established, the network manager can determine if any of the one or more nodes is the node corresponding to the request to add a node based on identifying information that was provided by the one or more nodes, such as SSID, MAC address, etc. If a secure connection has not been established, operations continue at block 307, where the network manager waits until a secure connection with the node has been established and can be identified (e.g., based on the identifying information supplied by the node during connection establishment). If a secure connection has been established, operations continue at block 309, where the network manager communicates the wireless mesh network configuration to the node over the secure connection.

Variations

As described in reference to FIGS. 1-3, provisioning a node is performed to establish ownership of the node for a user having an account with the mesh service provider so the node can be added to a wireless mesh network of the user as a satellite node. In implementations, ownership of nodes may be pre-established when the mesh service provider issues nodes to users. For instance, with reference to FIG. 1, when a node is issued to a user, the mesh service provider may record the serial number or other persistent data/metadata that uniquely identifies the node and store this recorded information in association with the user's account (e.g., in the repository 113). When the node subsequently boots and the service 107 establishes the secure connection over which it receives the mesh network configuration, the service 107 may request the configuration from the network manager 101 and indicate the node serial number in the request. The network manager 101 then will retrieve the mesh network configuration maintained for the user that is associated with the node identified by the serial number indicated in the request and provide the configuration to the node without the user first scanning the node's QR code/barcode. The code scanning can be omitted because the ownership of the node was established when the node was issued to the user and the serial number was recorded in association with the user's account.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 3, the depicted operations can be performed in parallel or concurrently as multiple requests are received for different nodes. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
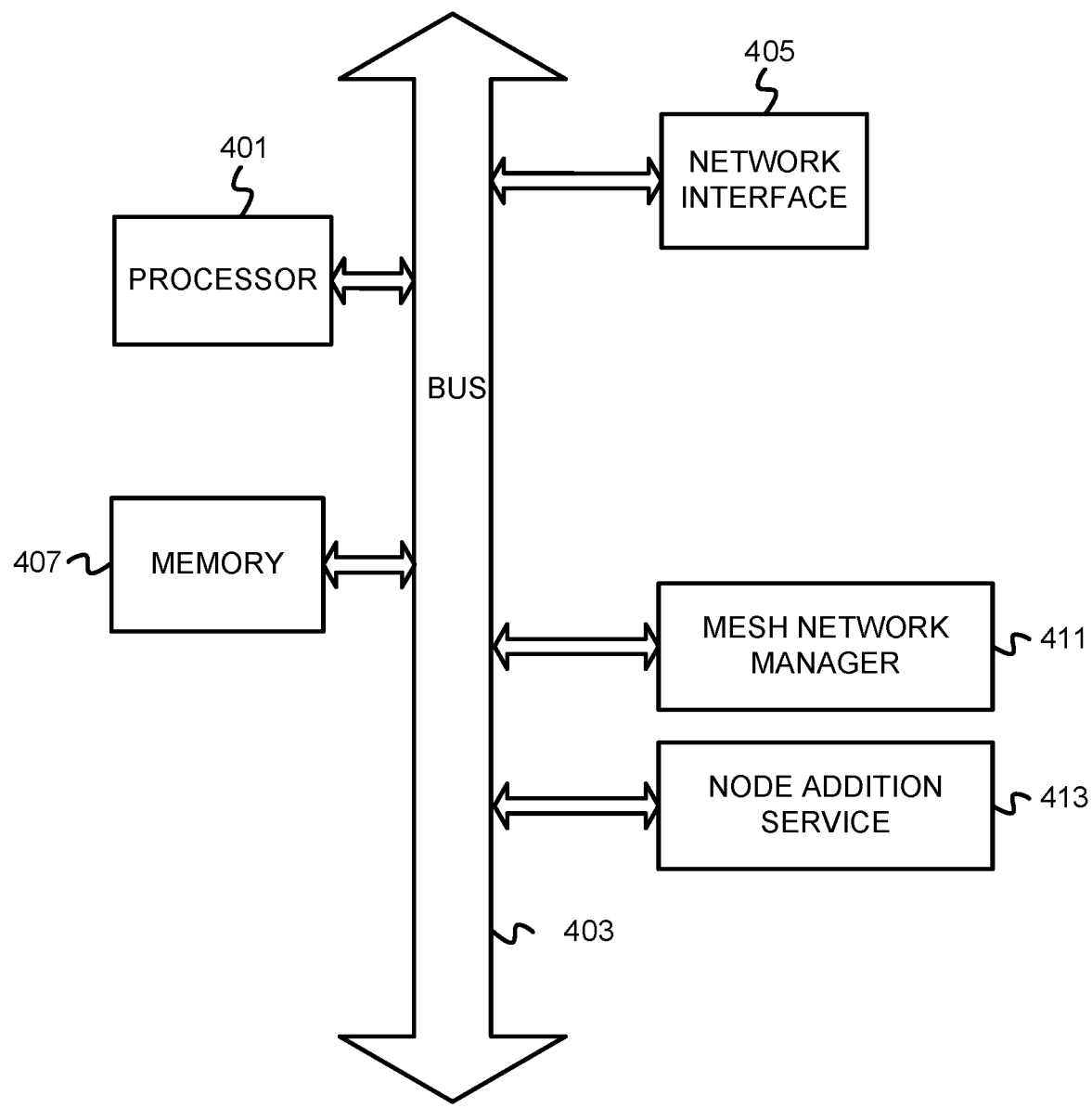
FIG. 4 depicts an example computer system with a mesh network manager and a node addition service.

FIG. 4 depicts an example computer system with a mesh network manager and a node addition service. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes mesh network manager 411 and node addition service 413. The mesh network manager 411 manages wireless mesh networks by facilitating addition of satellite nodes to wireless mesh networks and maintaining/updating wireless mesh network configurations for end users of the wireless mesh networks. The node addition service 413 adds a node on which it executes to a wireless mesh network as a satellite node using certificate-based authentication. While depicted as part of the same system in FIG. 4 for simplicity, the mesh network manager 411 and the node addition service 413 do not necessarily execute on the same device. For instance, the mesh network manager 411 can execute on a cloud instance (e.g., a cloud server), and the node addition service 413 can execute on a network device. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403.

Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for adding nodes to a wireless mesh network with certificate-based authentication as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
    identifying, by a first network device, a first wireless network that is configured as an enterprise network, wherein a second network device transmits a wireless signal of the first wireless network;
    attempting to connect to the first wireless network based on authenticating to the second network device using a device certificate installed on the first network device, wherein the device certificate was issued to the first network device by a certificate authority of a provider of a wireless mesh network to which the first network device is being added;
    based on the first network device connecting to the first wireless network, the first network device establishing a secure connection with an external service associated with the provider of the wireless mesh network;
    retrieving a configuration of the wireless mesh network from the external service over the secure connection, wherein the configuration comprises a first service set identifier (SSID) of the wireless mesh network; and
    transmitting a wireless signal of the wireless mesh network by the first network device based on installing the configuration.

2. The method of claim 1, wherein the first wireless network is associated with a second SSID that is the same as the first SSID, and wherein the second network device is a node of the wireless mesh network.

3. The method of claim 1, wherein the first wireless network is associated with a second SSID that is different from the first SSID, and wherein the second network device is not a node of the wireless mesh network.

4. The method of claim 3 further comprising, based on installing the configuration,
    determining that the first SSID indicated in the configuration of the wireless mesh network is different from the second SSID;
    terminating the connection to the first wireless network; and
    establishing a network connection using the first SSID based on authenticating to a node of the wireless mesh network with the device certificate.

5. The method of claim 1 further comprising limiting communications over the first wireless network to communications between the first network device and the external service until installing the configuration of the wireless mesh network, wherein installing the configuration of the wireless mesh network configures the first network device as a node of the wireless mesh network.

6. The method of claim 1 further comprising the external service communicating the configuration to the first network device based on receiving a request to add the first network device to the wireless mesh network, wherein the external service maintains configurations of wireless mesh networks for users that have accounts with the provider of the wireless mesh network.

7. The method of claim 6 further comprising:
    based on receiving the request, the external service determining identifying information of a first of the users associated with the request based on login session information; and
    retrieving the configuration from the maintained configurations of wireless mesh networks based on the identifying information of the first user.

8. The method of claim 1 further comprising:
    based on analyzing beacon frames detected by the first network device that correspond to one or more wireless networks, determining if each of the beacon frames indicates that the corresponding one of the one or more wireless networks is configured as an enterprise network based on determining if each of the beacon frames indicates that the corresponding one of the one or more wireless networks is configured with a version of Wi-Fi Protected Access (WPA)-Enterprise,
    wherein the one or more wireless networks includes the first wireless network, and
    wherein identifying the first wireless network comprises determining that a first of the beacon frames that was transmitted by the second network device indicates that the first wireless network is configured as an enterprise network.

9. The method of claim 1 further comprising:
    based on failing to connect to the first wireless network, identifying a second wireless network that is configured as an enterprise network, wherein a third network device transmits signal of the second wireless network;
    attempting to connect to the second wireless network based on authenticating to the third network device using the device certificate; and
    based on connecting to the second wireless network, establishing the secure connection with the external service associated with the provider of the wireless mesh network.

10. The method of claim 1, wherein the external service associated with the provider of the wireless mesh network is a cloud-based service managed by the provider of the wireless mesh network.

11. One or more non-transitory machine-readable media having program code stored thereon for adding a new node to a wireless mesh network, the program code comprising instructions to:
    based on detection of a wireless signal of the wireless mesh network, determine that the wireless mesh network is configured as an enterprise network;
    attempt to establish a network connection via a first node of the wireless mesh network based on using a digital certificate installed on the new node to authenticate to the first node, wherein the digital certificate was issued by a certificate authority of a provider of the wireless mesh network;

based on establishment of a network connection by the new node, retrieve a configuration of the wireless mesh network from the provider of the wireless mesh network, wherein the configuration of the wireless mesh network comprises a service set identifier (SSID) of the wireless mesh network; and based on installation of the configuration by the new node, transmit the wireless signal of the wireless mesh network.

12. The non-transitory machine-readable media of claim 11, wherein the program code further comprises instructions to determine which of a plurality of available wireless networks are configured as enterprise networks based on analysis of detected frames transmitted by a corresponding plurality of network devices.

13. The non-transitory machine-readable media of claim 12, wherein the instructions to determine which of the plurality of available wireless networks are configured as enterprise networks comprise instructions to determine which of the plurality of available wireless networks have a version of Wi-Fi Protected Access (WPA)-Enterprise implemented based on analysis of the detected frames, and wherein the instructions to determine that the wireless mesh network is configured as an enterprise network comprise instructions to determine that the wireless mesh network has a version of WPA-Enterprise implemented based on analysis of a corresponding one of the detected frames.

14. The non-transitory machine-readable media of claim 11, wherein the program code further comprises instructions to establish a secure connection with a service offered by the provider of the wireless mesh network based on establishment of the network connection, and wherein the instructions to retrieve the configuration from the provider of the wireless mesh network comprise instructions to retrieve the configuration over the secure connection.

15. The non-transitory machine-readable media of claim 14, wherein the instructions to establish the secure connection with the service comprise instructions to establish a connection secured with Secure Socket Layer (SSL)/Transport Layer Security (TLS) based on use of the digital certificate.

16. The non-transitory machine-readable media of claim 11, wherein the first node is not a node of the wireless mesh network, and wherein the program code further comprises instructions to, until network connection establishment is successful:

based on unsuccessful establishment of a network connection and detection of a signal of a different wireless network, determine that the different wireless network is configured as an enterprise network; and attempt network connection establishment based on authentication to a node transmitting a signal of the different wireless network with the digital certificate.

17. A network device comprising:

a processor; and a non-transitory computer-readable medium having instructions stored thereon that are executable by the processor to cause the network device to, based on detection of a wireless signal of a wireless mesh network to which the network device is being added, determine that the wireless mesh network is configured as an enterprise network;

authenticate to a first node of the wireless mesh network using a device certificate that has been installed on the network device by a provider of the wireless mesh network, wherein a certificate authority of the provider of the wireless mesh network previously issued the device certificate to the network device;

establish a secure connection with an external service associated with the provider of the wireless mesh network;

retrieve a network configuration of the wireless mesh network over the secure connection, wherein the network configuration comprises a service set identifier (SSID) of the wireless mesh network; and based on installation of the network configuration, transmit the wireless signal of the wireless mesh network.

18. The network device of claim 17, wherein the instructions executable by the processor to cause the network device to determine that the wireless mesh network is configured as an enterprise network comprise instructions executable by the processor to cause the network device to determine that the wireless mesh network is configured with a version of Wi-Fi Protected Access (WPA)-Enterprise.

19. The network device of claim 17 further comprising instructions executable by the processor to cause the network device to analyze detected frames that were transmitted by one or more other network devices, wherein the one or more other network devices comprise the first node, and wherein the instructions executable by the processor to cause the network device to determine that the wireless mesh network is configured as an enterprise network comprise instructions executable by the processor to cause the network device to determine that a first of the detected frames that was transmitted by the first node indicates that the wireless mesh network is configured as an enterprise network.

20. The network device of claim 17 further comprising instructions executable by the processor to cause the network device to limit network communications to the external service until installation of the network configuration, wherein installation of the network configuration configures the network device as a node of the wireless mesh network.

* * * * *